(12) United States Patent
Nemser et al.

(10) Patent No.: US 6,221,247 B1
(45) Date of Patent: Apr. 24, 2001

(54) DIOXOLE COATED MEMBRANE MODULE FOR ULTRAFILTRATION OR MICROFILTRATION OF AQUEOUS SUSPENSIONS

(75) Inventors: Stuart Marshall Nemser, Wilmington; George Alfred Cragg, Middletown, both of DE (US)

(73) Assignee: CMS Technology Holdings, Inc., Wilmington, DE (US)

( * ) Notice: Subject to any disclaimer, the term of this patent is extended or adjusted under 35 U.S.C. 154(b) by 0 days.

(21) Appl. No.: 09/324,897

(22) Filed: Jun. 3, 1999

(51) Int. Cl.$^7$ .................................................. B01D 63/00
(52) U.S. Cl. .................. 210/321.6; 210/500.36; 210/490
(58) Field of Search ............... 210/500.27, 500.28, 210/500.36, 506, 650, 651, 490, 321.6; 55/524

(56) References Cited

U.S. PATENT DOCUMENTS

| | | |
|---|---|---|
| Re. 33,273 | 7/1990 | Speaker . |
| 4,230,463 | 10/1980 | Henis et al. . |
| 5,116,650 * | 5/1992 | Bowser . |
| 5,238,471 | 8/1993 | Blanchet-Fincher . |
| 5,288,304 * | 2/1994 | Koros et al. . |
| 5,462,586 * | 10/1995 | Sugiyama et al. . |
| 5,641,844 * | 6/1997 | Thompson et al. . |
| 5,646,223 | 7/1997 | Navarrini et al. . |
| 5,795,668 * | 8/1998 | Banerjee . |
| 5,883,177 | 3/1999 | Colaianna et al. . |

FOREIGN PATENT DOCUMENTS

803557 * 10/1997 (EP) .

OTHER PUBLICATIONS

Koros, W.J., Membranes: Learning a Lesson from Nature, Chemical Engineering Progress Oct. 1995, pp 68–80.
Hamza, A., et al., Development of membranes with low surface energy to reduce the fouling in ultrafiltration applications, Journal of Membrane Science 131 (1997) 217–227.
Zeman, L. J., et al. Microfiltration and Ultrafiltration: Principles and Applications, Marcel Dekker, Inc.NY., 1996,, pp. 327–343.
Nemser, S. M., SBIR Program Proposal 08601452 Abstract 1–13–98 date of publication Jun. 5, 1998.
Brady, R.F.,Jr., In search of non–stick coatings, Chemistry & Industry Features, Mar. 17, 1997.
Ho, W.S.W., et al., Membrane Handbook, Chapman Hall, NY, 1992, pp393–397, 432–441, and 457–460.

* cited by examiner

Primary Examiner—Ana Fortuna
Assistant Examiner—Richard W. Ward
(74) Attorney, Agent, or Firm—Jeffrey C. Lew

(57) ABSTRACT

A filter useful for the ultrafiltration and microfiltration of aqueous suspensions includes a microporous membrane structure that has pores of size effective to reject particles in the range of about 0.01–10 $\mu$m. At least a portion of the membrane structure in contact with the suspension has a surface energy less than that of polytetrafluoroethylene. Low surface energy can be achieved by coating a microporous substrate with a substance such as fluorine substituted dioxole polymer. The filter has superior resistance to fouling by species suspended in the aqueous suspension and can continuously filter flow of such suspension in excess of 100 L/(m$^2$–h) for more than 150 hours. The new filter is useful in many traditionally fouling prone ultrafiltration and microfiltration membrane applications such as the filtering of shipboard generated graywater waste.

6 Claims, 7 Drawing Sheets

DIOXOLE COATED MEMBRANE MODULE FOR ULTRAFILTRATION OR MICROFILTRATION OF AQUEOUS SUSPENSIONS

This invention was made with Government support under contract number N00167-98-C0044 awarded by the Department of Defense. The Government has certain rights in the invention.

FIELD OF THE INVENTION

This invention relates to membrane separation of very small particle contaminants suspended in aqueous media. More specifically, it relates to filtering particles in the size range of about 0.01–10 $\mu$m from aqueous suspension using a microporous membrane coated with low surface energy composition.

BACKGROUND AND SUMMARY OF THE INVENTION

Microfiltration and ultrafiltration are two recognized types of membrane separation processes. See Membranes: Learning a Lesson from Nature, Koros, W. J., *Chemical Engineering Progress*, October 1995, pp. 68–80, the disclosure of which is incorporated herein by reference. These processes are known for such representative utilities as processing corn-stillage streams, concentrating emulsions and cell suspensions, reducing bacteria and particulate turbidity, recovering paint, removing oil microemulsion and separating biomolecules and virus from aqueous streams.

In microfiltration and ultrafiltration the mechanism for separation involves sieving of primarily liquid feed streams containing suspended species through a microporous membrane. The driving force for separation is a transmembrane pressure differential, i.e., the feed stream side is placed at a higher pressure than the filtrate stream side to force the liquid through the membrane pores. The transmembrane pressure gradient can be created by applying a pressure to the feed and/or by drawing a vacuum on the filtrate. Of course, suspended species of size larger than the membrane pores are rejected which yields a filtrate free of large species and a retentate stream concentrated in the rejected species.

Microfiltration and ultrafiltration suffer from the serious drawback that the membrane tends to foul over time in service. That is, as filtration continues the pores become blocked which reduces and ultimately stops the separation process until the foulant is cleaned if possible, or the fouled membrane is replaced with virgin membrane.

Fouling of microporous membranes in microfiltration and ultrafiltration has been studied extensively. While the mechanisms and theories concerning fouling are very complex, two general categories have been identified, namely deposition and adsorption fouling phenomena. Deposition fouling occurs as a result of hydrodynamic forces. The pressure gradient across the membrane actively pushes the foulant species into the pores. Adsorption fouling relates to the adhesiveness between the foulant and the membrane. Generally, suspended species to be separated from the feed liquid that have great affinity for the membrane material tend to adhere to the membrane at the surface and in the pores. The bulk of foulant species settling on and in the membrane prevents further transmembrane flow of liquid.

Adsorption fouling, and to some extent deposition fouling, can be affected by the chemistry of the feed stream and membrane system. For example, electrically charging the membrane can sometimes effectively mitigate fouling by polar species from nonpolar liquid or vice versa. In many practical separations, however, the species to be separated possess a wide range of polarity. Therefore, membrane charging is useful in those specific separations to which it is amenable.

It is highly desirable to have a microfiltration and/or ultrafiltration process that is resistant to fouling in a wide variety of feed stream composition systems. Hence, according to the present invention there is now provided a method of filtering a suspension comprising the steps of contacting one side of a two-sided microporous membrane structure with a suspension in an aqueous medium, the structure having passageways through the structure of a size effective to reject species suspended in the aqueous medium of size in the range of about 0.01–10 $\mu$m;

creating a transmembrane pressure gradient effective to cause aqueous medium to pass through the microporous membrane structure to the other side of the membrane structure to form a filtrate substantially free of rejected species; and removing the filtrate, in which at least a portion of the microporous membrane structure in contact with the suspension comprises a substance having a surface energy less than that of tetrafluoroethylene homopolymer.

DETAILED DESCRIPTION

Figure 1:
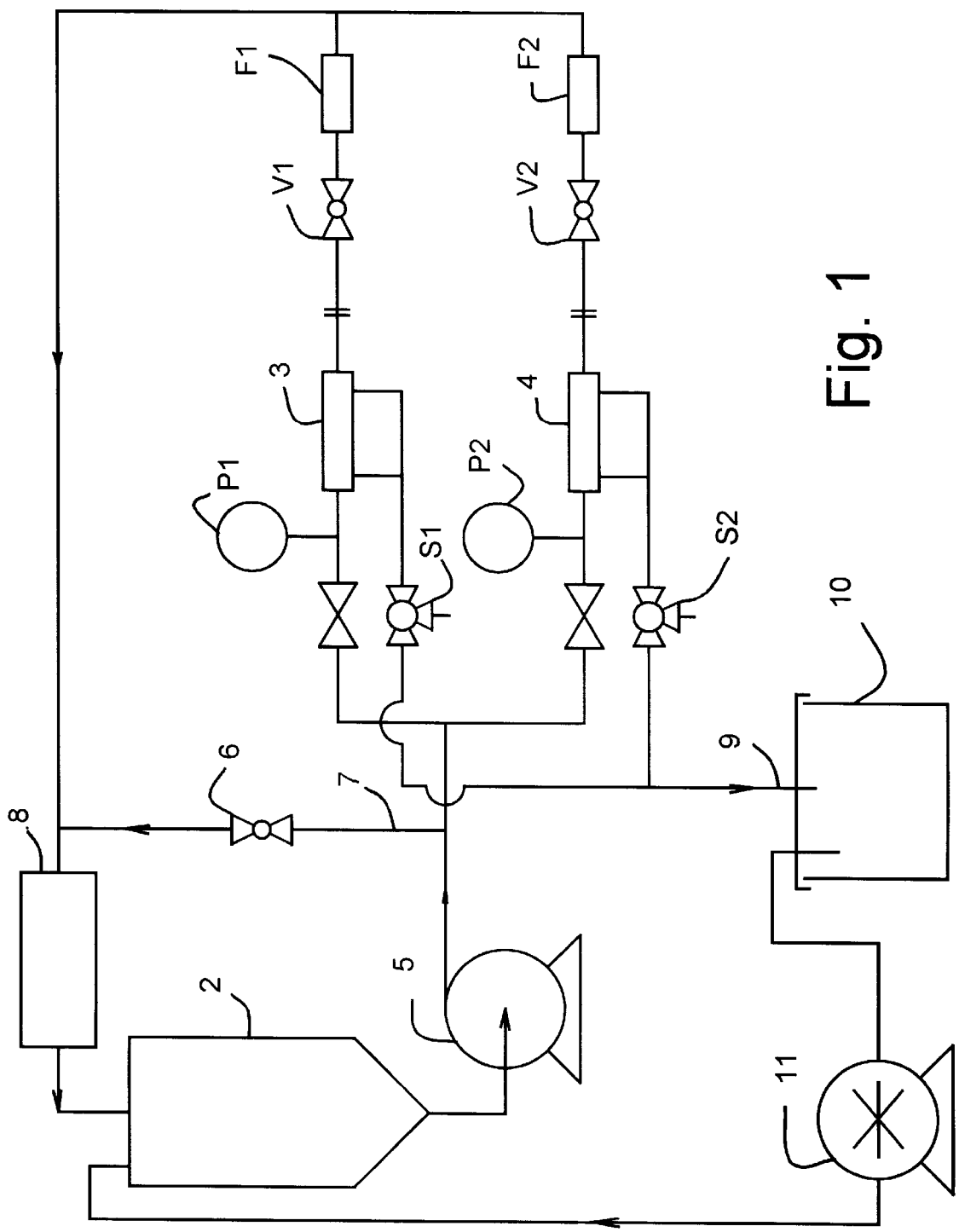
FIG. 1 is a schematic diagram of an apparatus for simultaneously testing performance of two microporous membrane filtration modules.

This invention is directed to microfiltration and ultrafiltration (occasionally referred to herein collectively as "filtration") of species in the nominal size range of about 0.01–10 µm. The term "species" sometimes referred to herein as "particles" means the discrete phase of finely divided material mixed in the liquid to be clarified. The term "nominal size" means the dimension characteristic of the species to be filtered. Many particles which are desired to be filtered are spherical or nearly spherical and may be characterized by their diameter. However, it is known in the art that particles of industrial interest typically have irregular shape and thus cannot be so characterized. The relationship between nominal size and actual dimensions of particular species depend upon the nature of the substance and will be understood by those of ordinary skill in the pertinent art.

The membrane for use according to this invention comprises a microporous structure adapted to reject species of the aforementioned nominal size. In a broad sense, the microporous structure is a solid medium having pores which define passages extending form one outside surface completely through the medium to another outside surface. The diameters of the pores should be of a size operative to block the passage through the membrane of species suspended in a liquid which are larger than desired, i.e., larger than 0.01–10 µm for ultrafiltration and microfiltration. At the same time, the pore diameters will allow the liquid and smaller particles to pass. The pores may be characterized directly by their physical dimensions or in other ways, such as by a "molecular weight cut off" ("MWCO"). MWCO is understood to be the molecular weight of a standard solute, such as monodisperse polyethylene oxide or dextran molecules of which about 90% is rejected by the microporous substrate. Accordingly, species of size greater than the characteristic pore diameter or molecular weight cut off theoretically will be rejected by a given microporous substrate.

The material selected for the membrane should have numerous attributes which render the membrane suitable for filtration service, such as structural integrity to withstand the pressure gradient of filtration and chemical resistance to attack or dissolution by the filtered species and filtrate. The material should also have the ability to be fabricated readily into the preselected membrane shape for a particular application. Additional design criteria and considerations in the fabrication of microfilter and ultrafilter devices are disclosed in Zeman, L. J., et al., Microfiltration and Ultrafiltration Principles and Applications, Marcel Dekker, Inc., New York, 1996, which is incorporated herein by reference, and especially in Chapter 6 titled Module Design and Membrane Configurations starting on page 327 of this reference.

Foremost among the important properties according to the novel method is that the membrane material should have a suitably low surface energy that will make adsorption of the potentially fouling species less favorable than staying dispersed within the liquid in the feed mixture. It has been found that many materials used in conventional membrane filtration processes have surface energy of about 30–80 dynes/cm. Polytetrafluoroethylene, "PTFE", the homopolymer of tetrafluoroethylene, is customarily deemed to anchor the low end of the useful range of surface energy for traditional membrane materials at about 18.5 dynes/cm. The term "low surface energy" is used here to mean materials with lower surface energy than PTFE and which thus provide greater resistance to fouling in microfiltration and ultrafiltration service.

Certain polymers comprising fluorine substituted dioxole monomer have been discovered to have a surface energy of about 15 dynes/cm and are much preferred. Exemplary of these preferred low surface energy compositions are homopolymers and copolymers comprising a perfluorodioxole monomer that has the following formula (I)

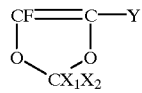

wherein Y is either F or a perfluoroalkoxylic moiety, —OR$_F$, with 1–5 carbon atoms, linear or branched when possible; and, when Y is F, then $X_1$ and $X_2$ are both $CF_3$ and when Y is —OR$_F$, then $X_1$ and $X_2$ are each independently selected from among F and $CF_3$. The perfluoroalkoxylic substituted monomer is more completely described in U.S. Pat. No. 5,883,177, and the methods of preparing and obtaining this composition are set forth in U.S. Pat. Nos. 5,498,682 and 5,646,223, the disclosures of all of which are incorporated herein by reference. The monomer of formula I in which Y is F is also known as perfluoro-2,2-dimethyl-1,3-dioxole, occasionally referred to as "PDD".

In some preferred embodiments, the low surface energy polymer comprises copolymerized PDD and at least one monomer selected from the group consisting of tetrafluoroethylene ("TFE"), perfluoromethyl vinyl ether, vinylidene fluoride and chlorotrifluoroethylene. In other preferred embodiments, the copolymer is a dipolymer of PDD and a complementary amount of TFE, especially such a polymer containing 50–95 mole % of PDD. Examples of dipolymers are described in further detail in U.S. Pat. Nos. 4,754,009 of E. N. Squire, which issued on Jun. 28, 1988; and 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all of these U.S. patents are hereby incorporated herein by reference.

The copolymer of PDD is amorphous and can be characterized by its glass transition temperature ("$T_g$"). Glass transition temperature property of a polymer is understood in the art. It is the temperature at which the copolymer changes from a brittle, vitreous or glassy state to a rubbery or plastic state. The glass transition temperature of the amorphous copolymer will depend on the composition of the specific copolymer of the membrane, especially the amount of TFE or other comonomer that may be present. Examples of $T_g$ are shown in FIG. 1 of the aforementioned U.S. Pat. No. 4,754,009 of E. N. Squire as ranging from about 260° C. for dipolymers with 15% tetrafluoroethylene comonomer down to less than 100° C. for the dipolymers containing at least 60 mole % tetrafluoroethylene. It can be readily appreciated that perfluoro-2,2-dimethyl-1,3-dioxole copolymers according to this invention can be tailored to provide sufficiently high $T_g$ that a membrane of such composition can withstand exposure to steam temperatures. Hence, membranes of this invention can be made stream sterilizable and thereby suitable for various uses requiring sterile materials, especially those involving biological materials. Preferably, the glass transition temperature of the amorphous copolymer should be at least 115° C.

In another preferred embodiment the low surface energy polymer comprises the monomer 2,2,4-trifluoro-5-trifluoromethoxy-1,3-dioxole (hereinafter, "TDD"), being the composition of formula I in which $X_1$ and $X_2$ are both F and R$_F$ is $CF_3$. The low surface energy composition preferably comprises a copolymer of TDD in which the TDD amount ranges from 40 and 100% by moles; and the other comonomer chosen from one or more of the following:

tetrafluoroethylene, chlorotrifluoroethylene, hexafluoropropylene, perfluoroalkylvinylether (PAVE) of formula (II)

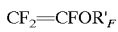

in which $R'_F$ is a perfluoroalkylic radical from 1 to 3 carbon atoms. The copolymers can be prepared with various Tg by varying the TDD percentage. The intrinsic viscosities of the polymers generally range from 20 to 200 cc/g, preferably 40–100 cc/g, measured for instance in Fluorinert® FC 75 (perfluoro(n-butyl tetrahydro-furane)) at 25° C. The preferred copolymers according to the present invention are the TDD copolymers with tetrafluoroethylene. The other comonomers when present are generally in amounts comprised between 0.1% by moles and 20% by moles, preferably lower than 10% by moles. The comonomers are generally chosen so as to give preferably a Tg higher than 100° C. Preferably the TDD amount ranges from 50 to 95% by moles.

Particularly preferred low surface energy compositions include a dipolymer of PDD and TFE, especially 85 mole % PDD/15 mole % TFE and 65 mole % PDD/35 mole % TFE copolymers, a dipolymer of TDD and TFE, especially 60 mole % TDD/40 mole % TFE copolymer and a terpolymer of PDD, TFE and maleic anhydride ("MA"), especially, 68.4 mole % PDD, 30.7 mole % TFE and 0.9 mole % MA.

In preferred embodiments, the membrane structure comprises a microporous substrate coated with a low surface energy material. The substrate material itself may, but need not exhibit low surface energy. The substrate can be any microporous material that allows passage of the filtrate. By "microporous" is meant that the structure has pores throughout which form continuous interstices or passageways extending from one side of the substrate through the thickness to the other side. Many conventional, readily available and thus generally inexpensive, microporous membrane substrate materials can be used provided that they are sufficiently compatible with the low surface energy material to accept a coating of the latter.

Generally organic or inorganic polymers mixed with organics can be used to prepare the microporous substrate material. Representative organic polymers suitable for the microporous substrates according to the invention include polysulfone; polyethersulfone; polycarbonate; cellulosic polymers, such as regenerated cellulose polymer, cellulose diacetate polymer, cellulose triacetate polymer, cellulose nitrate polymer, and blends of these; polyamide; polyimide; polyetherimide; polyurethane; polyester; polyacrylate and polyalkyl methacrylate, such as polymethyl methacrylate; polyolefin, such as polyethylene and polypropylene; saturated and unsaturated polyvinyls, such as polyvinyl chloride, polyvinyl fluoride, polyvinylidene chloride, polyvinylidene fluoride; polyvinyl alcohol, fluorine substituted polymer such as polytetrafluoroethylene and poly(tetrafluoroethylene-perfluoropropylvinylether); polyetheretherketone; polyacrylonitrile and polyphosphazine. Representative inorganic substrate compositions include zirconia, alumina, titanium dioxide, and $BaTiO_3$ based microporous media and the like.

It is important that the membrane structure be microporous and accordingly the coating of low surface energy material should be applied to the microporous substrate in a manner that does not cover and seal the passageways. Preferably the coating is applied from solution of the low surface energy material dissolved in a suitable solvent. Dilute solutions in concentration of about 0.005–5 wt. % solute are preferred to provide the desired microporous membrane structure after coating.

Coating the microporous substrate can be accomplished by contacting one side of the substrate with a dilute solution of the low surface energy material dissolved in solvent. Application of a pressure gradient across the substrate is optional. After a period of contact, the solution should be removed and the coated substrate dried of solvent by oven and/or forced air drying or similar drying method known in the art. To check that the coated membrane structure remains microporous, a low viscosity liquid, such as water or isopropyl alcohol can be placed on one side of the structure and a pressure drop of about 10–30 lbs/in$^2$ applied to drive the liquid through the membrane. Liquid flow confirms that the structure is microporous.

Fluorinated solvents are preferred for the solutions of low surface energy material. Representative solvents include mixtures of $C_6F_{14}$, $C_7F_{16}$ or $C_8F_{18}$ isomers, fluorinated mixtures containing $(C_4F_9)_2NCF_3$ (e.g., Fluorinert® FC-40 from 3M Co.), perfluorotetradecahydrophenanthrene oligomer mixtures, perfluoro-n-methylmorpholine, perfluoro-2-n-butyltetrahydrofuran and $C_8F_{16}O$ cyclic ether mixtures containing perfluoro-2-n-butyltetrahydrofuran (e.g., Fluorinert® FC-75 from 3M Co.), perfluorotributylamine and perfluorotriamylamine and 1,1,1,2,3,4,4,5,5,5-decafluorpentane (Vertrel® XF).

The microporous membrane structure for use according to this invention thus generally comprises a low surface energy microporous substrate or a microporous substrate coated with a low surface energy composition on at least a portion that is in contact with the suspension during filtration. The microporous membrane structure would normally be installed in a module for convenient operation of filtration. The novel filtration method can be used with any of the well known module configurations, such as flat sheet, hollow fiber, tubular, spiral wound and vortex devices (also known as "rotating" devices). Other useful configurations include pleated sheet and tube ribbon form. Membrane tubes and tube ribbons are disclosed in U.S. Pat. No. 5,565,166 which is incorporated herein by reference.

It is also acceptable to operate the novel method in either "dead end" or "cross flow" modes, although cross flow mode is generally preferred. "Dead end" mode here means the technique of admitting all feed suspension to a single inlet port on one side of the microporous membrane structure. Hence the feed suspension effectively flows into a chamber dead ended by the membrane structure. In contrast, "cross flow" here means providing a second port on the feed side of the membrane structure for discharge of excess feed. The two inlet ports are usually positioned to provide a flow across the surface of the feed side of the membrane structure. This is done to induce shear stress near the membrane structure which reduces concentration polarization. Dead end and cross flow modes are further described in the above mentioned Zeman et al. reference at pages 328–329.

The various advantages and disadvantages of the above-cited membrane module configurations and modes are understood by those of ordinary skill in the art. Selection of membrane module configuration and mode of operation typically devolves to choosing those which provide maximum advantage and least disadvantage for a specific separation to be effected.

This invention is now illustrated by examples of certain representative embodiments thereof, wherein all parts, proportions and percentages are by weight unless otherwise indicated.

EXAMPLES

Materials

Materials used in the examples are as follows:
(A) Low Surface Energy Materials:
  (1) dipolymer of 85 mole % polymerized PDD and 15 mole % polymerized TFE, (2) dipolymer of 65 mole % polymerized PDD and 35 mole % polymerized TFE, (3) dipolymer of 60 mole % polymerized TDD, and 40 mole % TFE, (4) terpolymer of 68.4 mole % polymerized PDD, 30.7 mole % TFE and 0.9 mole % maleic anhydride.

(B) Substrate Material:

polyvinylidene fluoride tubular membrane, nominal pore size 0.1 μm (100,000 Dalton molecular weight cut off) 15 inch long sections of 21 mm inner diameter laminated within a tubular braided support (Zenon MF 100, Zenon Environmental, Inc.).

Module Preparation

Figure 11:
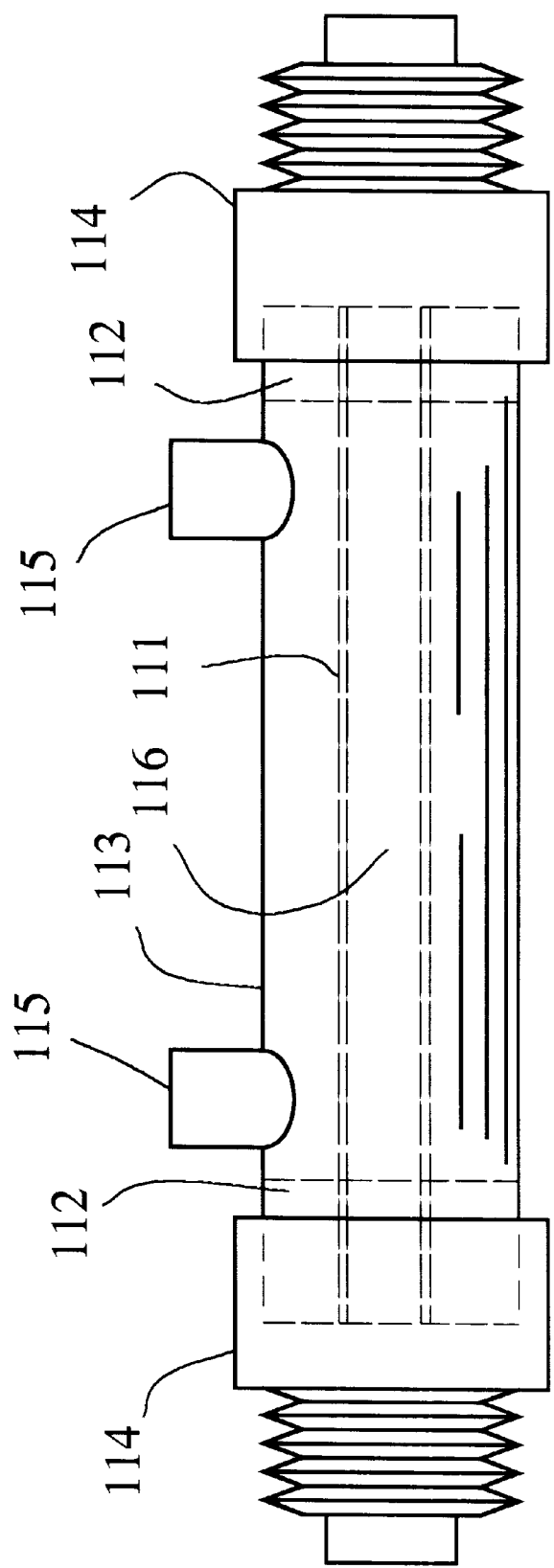
FIG. 11 is an elevational view of a tubular membrane module.

A tubular module configuration as shown in FIG. 11 was prepared as follows. Substrate tubes 111 were potted with epoxy resin 112 (tube and resin shown in phantom) into polyvinylchloride cylindrical shells 113 fitted with 1.25 inch national pipe thread end adapters 114, thus providing 180 cm$^2$ surface area for filtration. Thus the module had a tube side cavity defined by the lumen 116 of the tube 111 separated from a shell side cavity 117. The modules each had a pair of ¼ shell side ports 115 near the ends. Although each module in the tested and illustrated configuration contained only a single tube, it is contemplated that multiple tubes can be installed within a single shell.

0.1975 g of each of the low surface energy materials A1–A4 was separately dissolved into 395 g of 1,1,1,2,3,4,4,5,5,5-decafluorpentane to obtain 0.005 wt % solutions. The modules were oriented vertically over a 1 L beaker. The lower end cap fitting was plugged and solution was poured into the module from the top fitting thus filling the lumen of the tube. Some of the coating solution passed through the substrate to the shell (permeate) side. Solution was added as necessary to maintain the lumen full for two minutes after which a drain in the lower cap was opened to remove solution. The modules were oriented horizontally and 2–5 L per minute of air was blown through the lumen via the end cap fittings for at least one hour. After drying the end caps were removed from the modules.

Substrate tubes were delivered from the manufacturer with pores wet with glycerine. In some of the examples, as noted below, the solution of low surface energy material was coated directly onto the glycerine-wet substrate. In others, the glycerine was washed out of the pores with isopropyl alcohol prior to coating.

Examples 1–11

Figure 2:
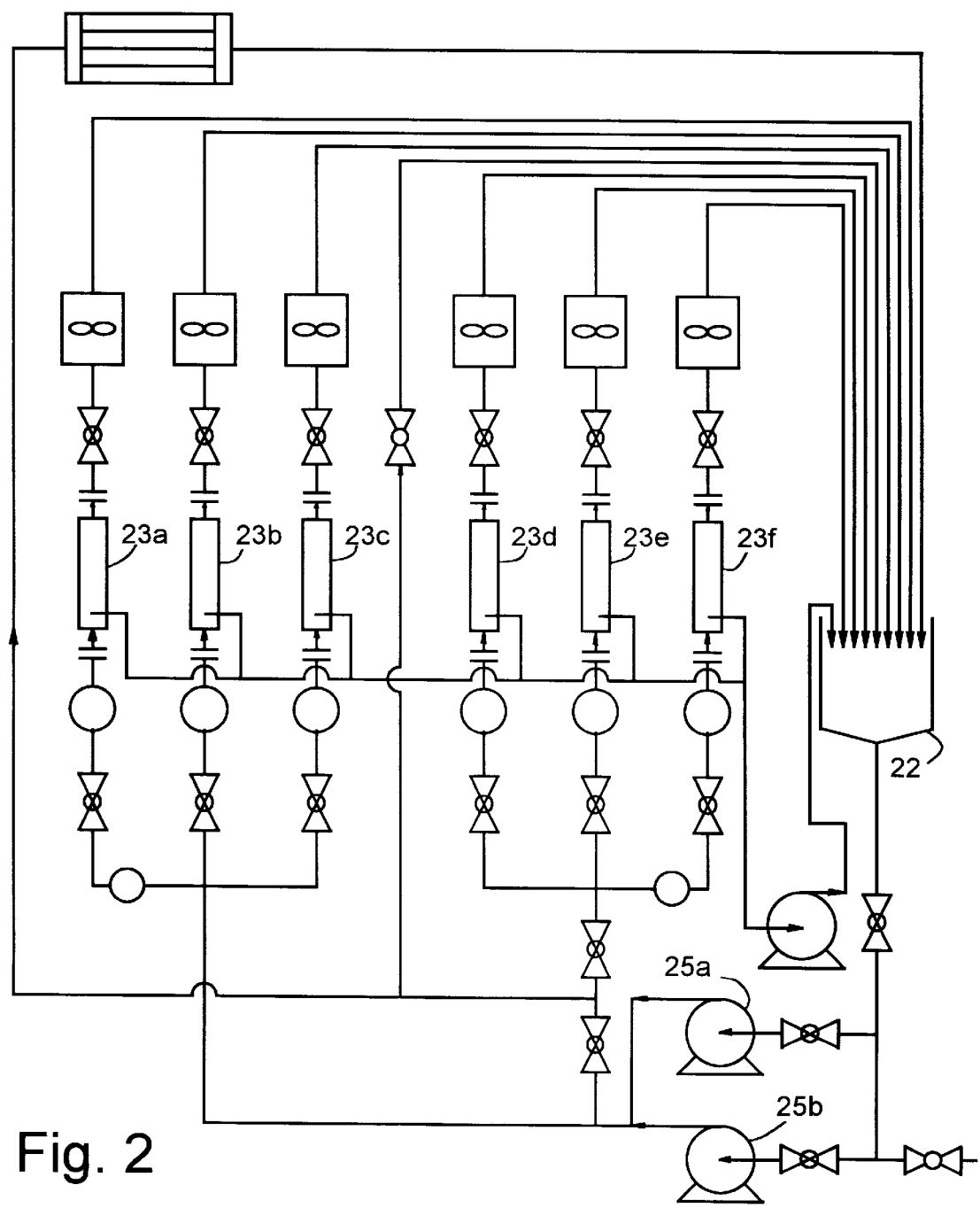
FIG. 2 is a schematic diagram of an apparatus for simultaneously testing performance of six microporous membrane filtration modules.

A coated membrane module to be tested was installed in parallel with an uncoated module of the same substrate in either a two-position or six-position test apparatus (FIG. 1 and FIG. 2, respectively). As seen in FIG. 1 the two-position apparatus had a 50 gallon feed tank 2 initially filled with simulated graywater feed mixture which was circulated through the lumens of coated filter tube module 3 and uncoated filter tube control module 4 by centrifugal pump 5. Pressures P1, P2 of the flows to the modules was controlled by valve 6 in side stream 7. To prevent heat buildup due to recirculation, a side stream was circulated through a cooling heat exchanger 8. The lumen discharge flows of each module were measured by flow meters F1, F2 then combined and returned to the feed tank. Adjustments were made with valves V1,V2 to obtain goal flow of 21 gals. per minute through each module. The filtrate was withdrawn from the shells of the modules through line 9 to a filtrate hold tank 10 from which it was returned to the feed tank via pump 11, thereby keeping the concentration of simulated graywater constant throughout the test. At certain times during the test, small amounts of filtrate were sampled for quality through valves S1,S2.

The six test position apparatus of FIG. 2 is essentially the same as the two position apparatus except that two centrifugal pumps 25a,25b were used to recirculate the simulated graywater from a 250 gal. feed tank 22 simultaneously through six modules 23a,–23f.

A standard simulated graywater was prepared by mixing 435 mg Tide® detergent, 2 g laundry starch, 750 mg gelatin, 50 ml of 5% aqueous ammonium chloride solution, 15 ml of 1 M aqueous sodium chloride solution, 2.5 ml 1 M aqueous trisodium phosphate solution, 10 g canned dog food, 350 mg Crisco® brand food shortening, and 350 mg Wesson® brand cooking oil into 5 L of tap water, heating the mixture to a boil for 30 minutes and cooling overnight.

Figure 3:
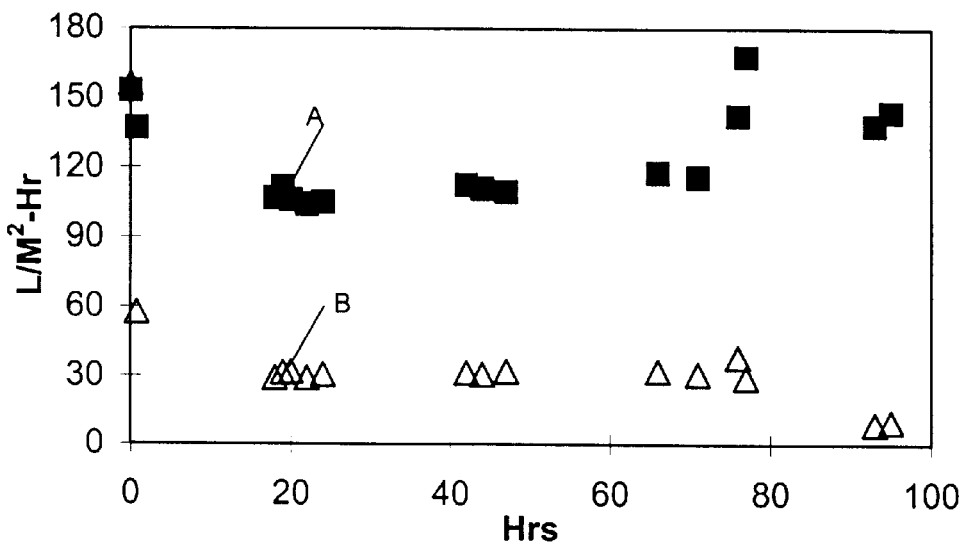
FIG. 3 is a plot of filtrate flow in $L/(m^2-h)$ against duration in hours of another test of microporous membrane ultrafilters.

Test conditions and resulting steady state flows are shown in Table 1. Filtrate flow in L/(m$^2$–h) for Example 1 is plotted against run duration in hours in FIG. 3. The filtrate flow through the coated filter tube module (data points A) exceeded that of the uncoated control (data points B) within the first hour of operation. Due to a leak, graywater supply was depleted after 70 hours at which time the membrane modules were removed for visual inspection. The uncoated tube appeared to have a thicker cake of solids clinging to the membrane surface than did the coated tube. The test was restarted with a replenished supply of simulated graywater. Filtrate flow of the coated membrane module far surpassed that of the control which dropped to nearly 0 L/(m$^2$–h) 25 hours after restarting. The test was then stopped and the modules were removed. Visual inspection showed that the uncoated control tube inside surface was extremely fouled in comparison to the coated tube.

Figure 4:
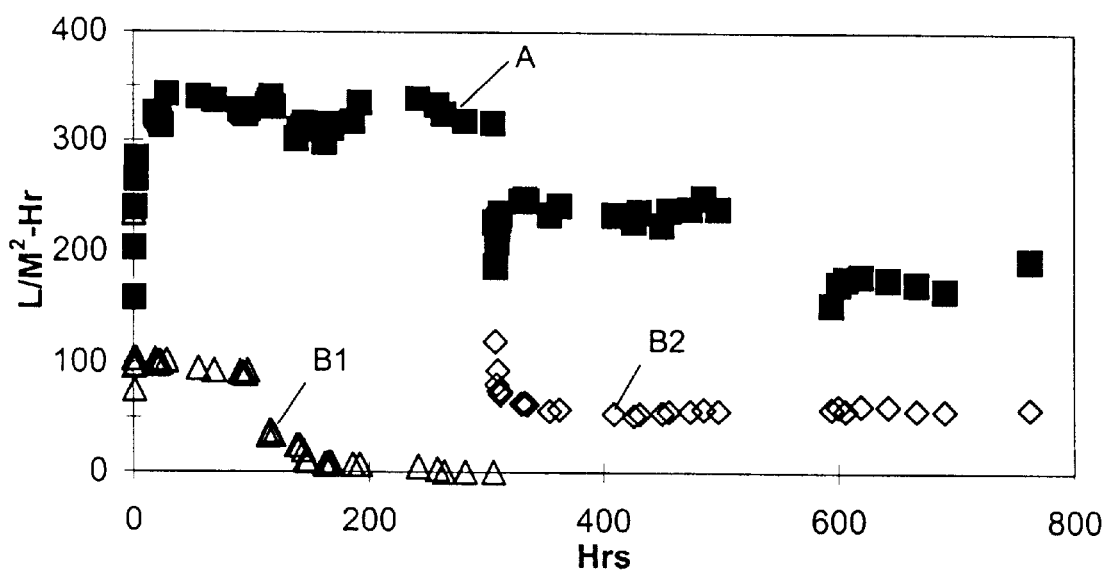
FIG. 4 is a plot of filtrate flow in $L/(m^2-h)$ against duration in hours of another test of microporous membrane ultrafilters.

Example 2 repeated the conditions of Example 1 and the filtrate flow in L/(m$^2$–h) data are plotted against run duration in hours in FIG. 4. Flow through the coated ultrafilter (data points A) initially rapidly rose to more than 300 L/(m$^2$–h) while the control rate dropped from an early peak of about 225 to about 100 L/(m$^2$–h) (data points B1). After about 100 hours the control rate dropped to zero, while the coated module flow remained high. The modules were disassembled after 300 hours and visual inspection revealed that the coated module had delaminated, i.e., the coating had peeled away from the tubular braided support, and the inside surface of the tube was covered with brown sludge. A new control module was installed and the test was restarted. Coated module flow gradually shifted from about 225 L/(m$^2$–h) to about 175 L/(m$^2$–h) until the test was shut down after a total duration of 762 hours. Flow through the second control module (data points B2) remained steady at about 60 L/(m$^2$–h) for the last 462 hours.

TABLE I

| Example | Coating | Coating Conc. (wt %) | Glycerine Wash | Apparatus (2 or 6) | Run Time (hrs) | Coated Module Feed Flow (gal./min.) | Coated Module Filtrate (L/m²-hr.) | Uncoated Module Feed Flow (gal./min.) | Uncoated Module Filtrate (L/m²-hr.) |
|---|---|---|---|---|---|---|---|---|---|
| 1 | A2 | 0.005 | No | 2 | 95 | | 121 | | 33 |
| 2 | A2 | 0.005 | No | 2 | 762† | | 243 | | 50 |
| 3 | A2 | 0.005 | No | 2 | 600 | | 134‡ | | 80‡ |
| 4 | A2 | 0.005 | No | 2 | 245 | | 277 | | 156 |
| 5 | A1 | 0.005 | No | 6 | 340 | | 130 | | 100 |
| 6 | A2 | 0.005 | * | 6 | 340 | | 120 | | 100 |
| 7 | A2 | 0.005 | ** | 6 | 523 | 22 | 200 | 22 | 133 |
| 8 | A2 | 0.005 | No | 6 | 523 | 22 | 177 | 22 | 133 |
| 9 | A3 | 0.005 | No | 6 | 713.5 | 20 | 303 | 20 | 224 |
| 10 | A4 | 0.005 | No | 6 | 713.5 | 20 | 238 | 20 | 224 |
| 11 | A2 | 0.005 | No | 6 | 713.5 | 21 | 234 | 20 | 224 |

*Pre-washed glycerine out with isopropyl alcohol (IPA), coated IPA-wet tube.
**Prewashed glycerine out with IPA and dried tube of IPA before coating.
†Control module test duration at 462 hours
‡Simulated graywater contained 10 times standard concentration of dog food, oils, and gelatin.

In Example 3, the procedure of Example 1 was repeated with the exceptions that the concentrations of the dog food, oils and gelatin in the simulated graywater formulation were respectively increased to ten times the standard concentrations and the feed suspension was aerated by bubbling air at about 1 L/min. and less than about 5 lbs./inch² from a diffuser block at the bottom of the tank for 14 hours prior to starting filtration. The aeration was done to promote microbial growth. The concentration was increased to better simulate the effect of increased feed species concentrations that occurs in the operating mode in which the species-free filtrate is removed rather than returned to the feed tank.

Figure 5:
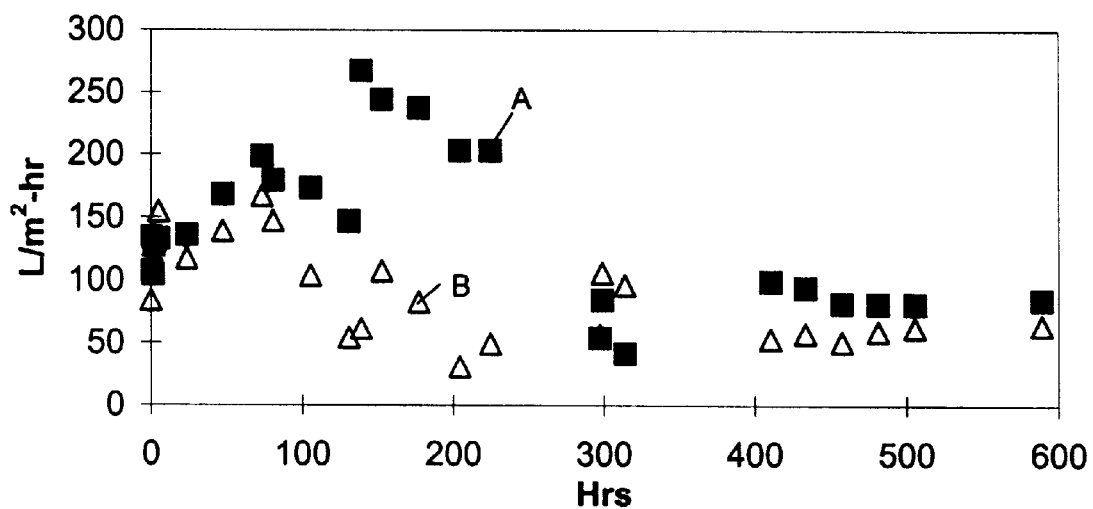
FIG. 5 is a plot of filtrate flow in $L/(m^2-h)$ against duration in hours of another test of microporous membrane ultrafilters.

The filtrate flow versus filtration time for Example 3 is plotted in FIG. 5 and stream properties at selected times are shown in Table II. At 100 hours of filtration, the filtrate transfer line began to leak which caused the concentrations of filterable species in the feed to increase to more than 40 times the standard concentrations. The concentrations were returned to the ten times standard level by dilution with water. FIG. 5 shows that filtrate from the coated filter tube module (data points A) dropped dramatically after 225 hours. At 300 hours, the tubes were inspected and the coated tube outside surface was found to be covered with mildew and mold. Some, but notably less severe mildew and mold growth was also evident on the uncoated modules. This growth phenomenon suggests that high Biochemical Oxygen Demand (BOD) and Chemical Oxygen Demand (COD) of the feed coupled with high filtrate flow rate promotes mold and mildew. The modules were soaked for 12 hours at room temperature in mild bleach solution of commercial household sodium hypochlorite bleach solution diluted to about 2–5 vol. % and upon return to service provided similar filtrate flow performance as prior to cleaning. More aggressive cleaning would likely have restored filtrate flow to higher values although the coated filter flow increased more than did the uncoated filter (data points B). The reduction in all property values between feed and filtrate samples seen in Table II indicates that the filters were adequately rejecting filterable species from the feed.

TABLE II

| | Time (hrs) | BOD mg/L | COD mg/L | TSS mg/L | O + G mg/L |
|---|---|---|---|---|---|
| Feed | 48 | 11,500 | 15,000 | 3,840 | 1,600 |
| Feed | 225 | 1,640 | 5,300 | 833 | 66 |
| Uncoated filtrate | 225 | 257 | 650 | 3 | ND |
| Coated filtrate | 225 | 662 | 650 | 5 | ND |

Figure 6:
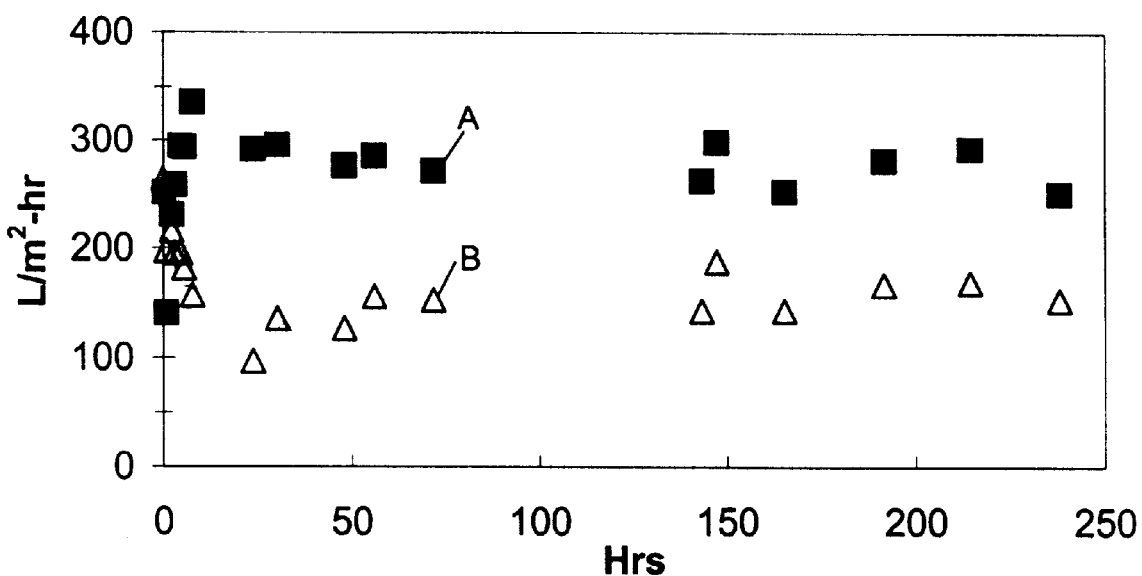
FIG. 6 is a plot of filtrate flow in $L/(m^2-h)$ against duration in hours of another test of microporous membrane ultrafilters.
Figure 7:
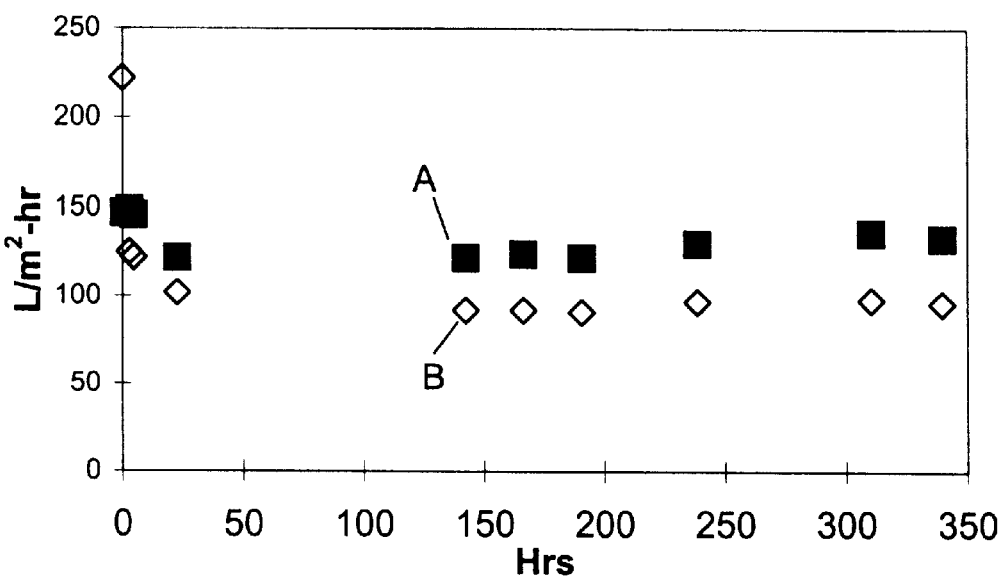
FIG. 7 is a plot of filtrate flow in $L/(m^2-h)$ against duration in hours of another test of microporous membrane ultrafilters.

Legend: BOD = Biological oxygen demand
COD = Chemical oxygen demand
TSS = Total Suspended Solids
O + G = oil and grease
ND = none detected Example 4 repeated the procedure of Example 1 with the difference that about 500 ml of commercial household sodium hypochlorite bleach initially, and 150 ml daily thereafter was added to standard simulated graywater composition to determine whether absence of biological growth affected performance by preventing growth on the membranes and preventing biodegradation of the feed composition. The coated ultrafilter module (data points A) provided about twice the filtrate flow of uncoated module (data points B) as seen in FIG. 6.

The procedure of Example 5 was the same as Example 1 except that the coating on the ultrafilter tube was an 85 mole % PDD/15 mole % TFE dipolymer. FIG. 5 shows that coated tube filtrate flow (data points A) was at least about 25% higher than the control (data points B).

Figure 8:
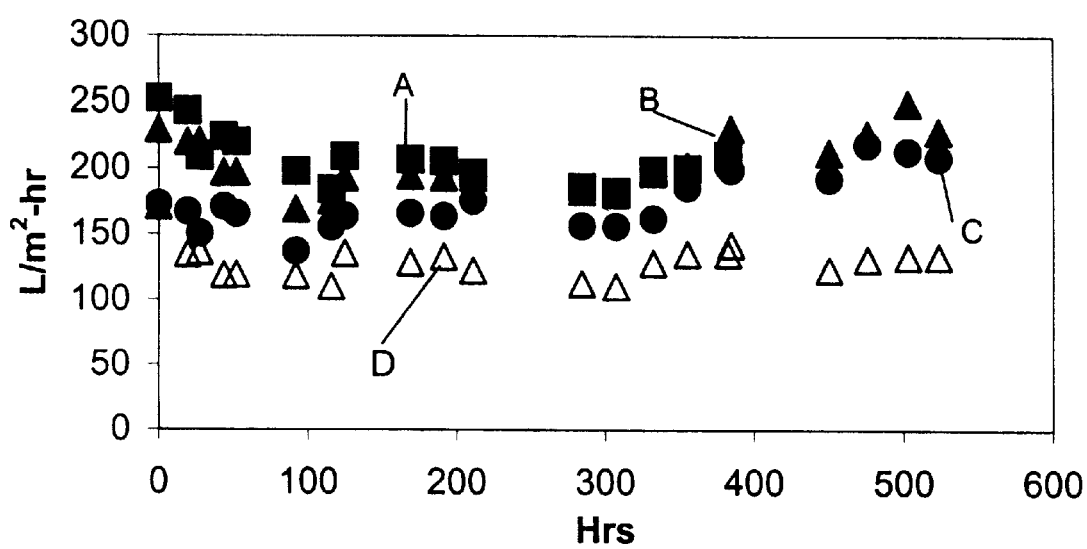
FIG. 8 is a plot of filtrate flow in $L/(m^2-h)$ against duration in hours of another test of microporous membrane ultrafilters.

Examples 6–8 explored how removal of glycerine in the original equipment ultrafilter tubes affected filtration. Results are shown in FIG. 8. The procedure of Example 1 was repeated except that in Example 6 (data points A) glycerine in the substrate pores was washed out with 99% v/v isopropyl alcohol (IPA) water solution and the coating was applied while the tube remained wet with IPA. In Example 7 (data points B) the glycerine was washed out but the tube was dried of IPA before applying the coating. Washing was accomplished by filling the lumen of a vertically oriented, bottom capped module with IPA for two minutes at room temperature. The coating was applied directly onto the glycerine packed tube in Example 8 (data point C) and data points D show the filtrate flow through the uncoated filter tube. All the coated filter tubes yielding higher filtrate flow than the uncoated control. Removing glycerine gave better results than coating over the glycerine and drying the IPA did not seem to have a significant effect.

Figure 9:
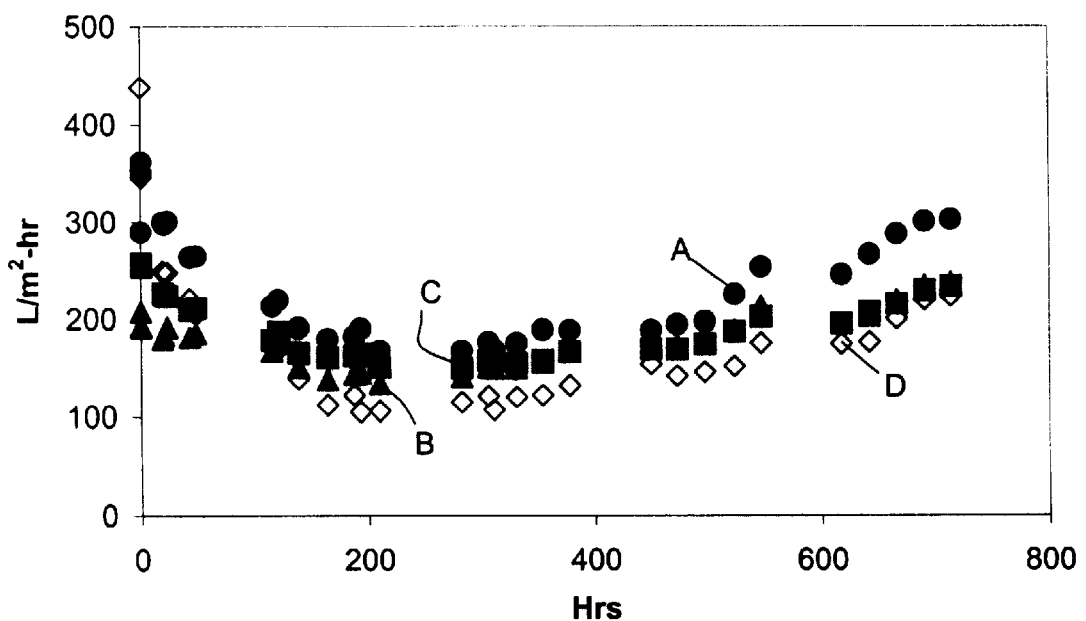
FIG. 9 is a plot of filtrate flow in $L/(m^2-h)$ against duration in hours of another test of microporous membrane ultrafilters.

FIG. 9 shows the filtrate flow performance of Examples 9–11 which demonstrate the effect of different coating compositions. After 100 hours, each of the coated tube modules yielded higher filtrate flows than control module flow D. Example 9 in which the tube was coated with 60 mole % TDD/40 mole % TFE (data points A) gave highest filtrate flow. Filtrate flows of Examples 10 and 11 with PDD-TFE-MA coated tubes (data points B) and 65 mole % PDD/35 mole % TFE coated tubes, respectively, performed about the same.

Example 12

Figure 10:
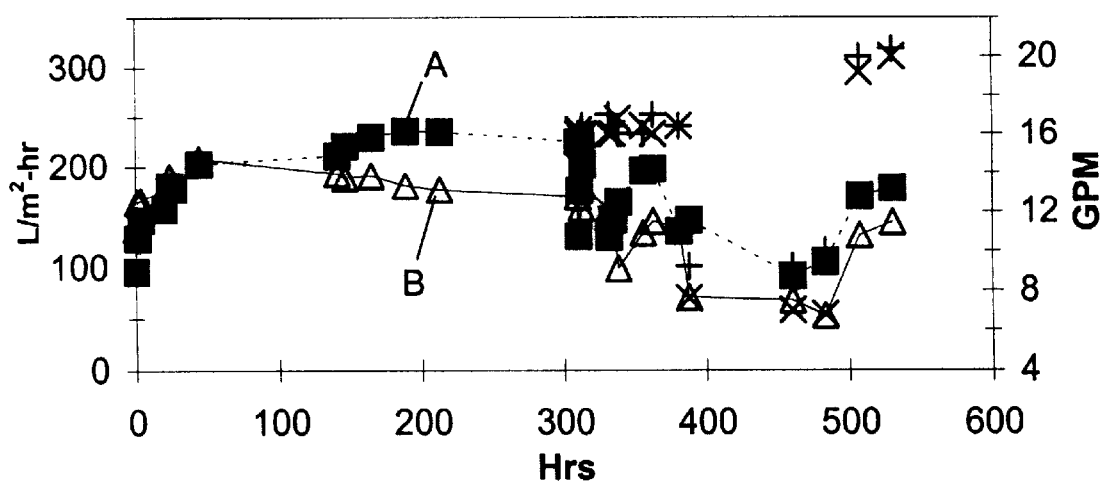
FIG. 10 is a plot of filtrate flow in $L/(m^2-h)$ against duration in hours of another test of microporous membrane ultrafilters.

The procedure of Example 4 was repeated in Example 12 and a plot of filtrate flow in L/(m$^2$–h) and feed flow in gal./min. versus run time is shown in FIG. 10. For about 150 hours the filtrate flows of the coated (data points A) and uncoated (data points B) modules were about the same. Then coated filter filtrate flow gradually increased while uncoated filter filtrate flow gradually decreased. In the figure, feed flow in gal./min. is shown by "+" and "x" symbols for the coated and uncoated modules, respectively. At about 380 hours of pumping feed at about 16 gal./min., feed rate was reduced to about 8 gal./min. while maintaining transmembrane pressure gradient at about 30 lbs./in.$^2$. At 484 hours, feed flow was increased to about 20 gal./min. Filtrate flow rates appeared to correlate with the changes in feed flows.

These examples demonstrate that the novel method can provide high filtrate flow rate from ultrafiltration and microfiltration of typical aqueous waste streams for extended durations. This improved resistance to membrane fouling renders the novel method ideally suited for cleaning many types of aqueous suspensions of very small particles. Ultrafiltration and microfiltration is deemed to be especially useful for processing aqueous waste water produced in isolated environments where weight, space, power or other constraints such as exist on transportation vehicles and at environmentally sensitive remote habitats impose limitations on the use of more complex and energy intensive traditional methods. For example, the novel method should be especially useful for processing waste water generated aboard maritime vessels, mobile homes, temporary campgrounds and the like. The novel method should also improve the effectiveness of traditional ultrafiltration and microfiltration applications mentioned above.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A membrane module comprising a two-sided microporous membrane structure having passageways through the structure of a size effective to reject species suspended in an aqueous medium which species are of size in the range of about 0.01–10 μm, said structure capable of passing a simulated graywater from a boiled mixture of a composition consisting of 435 mg detergent, 2 g laundry starch, 750 mg gelatin, 50 ml of 5% ammonium chloride solution, 15 ml of 1 M sodium chloride solution, 2.5 ml 1 M trisodium phosphate solution, 10 g canned dog food, 350 mg food shortening, 350 mg cooking oil per 5 L of tap water at a rate of at least 100 L/(m$^2$–h) continuously for longer than 150 hours when operated in a cross flow mode, in which said membrane structure comprises a microporous substrate having its microporous surfaces coated with a substance comprising a polymerized perfluoro-dioxole monomer having the following formula

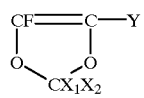

in which Y is either F or the perfluoroalkoxylic moiety —OR$_F$ of 1–5 carbon atoms and X$_1$ and X$_2$ are both CF$_3$ when Y is F, and X$_1$ and X$_2$ are each independently selected from the group consisting of F and CF$_3$ when Y is —OR$_F$, and in which the substance has a surface energy less than that of tetrafluoroethylene homopolymer.

2. The membrane module of claim 1 in which the substance comprises a copolymer comprising copolymerized 2,2,4-trifluoro-5-trifluoromethoxy-1,3-dioxole.

3. The membrane module of claim 1 in which the substance consists essentially of copolymerized perfluoro-2,2-dimethyl-1,3-dioxole, tetrafluoroethylene and maleic anhydride.

4. The membrane module of claim 1 in which the species comprise biological matter.

5. The membrane module of claim 4 in which the aqueous medium is drinking water and the species include microorganisms.

6. The membrane module of claim 1 in which the surface energy is at most 16 dynes/cm.

* * * * *